United States Patent [19]
Futer

[11] 3,890,011
[45] June 17, 1975

[54] SUPPLYING OBJECTS FROM AN AIR-FILM CONVEYOR RAPIDLY AND INTERMITTENTLY TO A MACHINE

[76] Inventor: Rudolph E. Futer, 1501 Park Ave., Emeryville, Calif. 94608

[22] Filed: July 10, 1972

[21] Appl. No.: 270,548

[52] U.S. Cl.................. 302/31; 221/236; 302/2 R
[51] Int. Cl............................................ B65g 51/00
[58] Field of Search .......... 214/1 BE; 221/236, 251, 221/278; 302/2 R, 29, 31; 198/76, 34

[56] References Cited
UNITED STATES PATENTS

| | | | |
|---|---|---|---|
| 2,805,898 | 9/1957 | Willis | 302/29 |
| 3,056,632 | 10/1962 | Isler | 302/31 |
| 3,089,732 | 5/1963 | Gamberini | 302/2 R |
| 3,210,124 | 10/1965 | Niemi et al. | 302/29 X |
| 3,304,619 | 2/1967 | Futer | 302/31 X |
| 3,323,155 | 6/1967 | Cooley et al. | 221/236 X |
| 3,337,064 | 8/1967 | Mojden et al. | 302/2 R X |
| 3,351,388 | 11/1967 | Frank | 302/2 R |
| 3,382,010 | 5/1968 | Wilkinson | 302/31 X |
| 3,384,287 | 5/1968 | Miller | 302/2 R X |
| 3,497,086 | 2/1970 | Adams et al. | 221/278 X |
| 3,598,043 | 8/1971 | Schuff | 302/2 R X |
| 3,717,281 | 2/1973 | Brownbill | 221/278 |

*Primary Examiner*—Evon C. Blunk
*Assistant Examiner*—Jeffrey V. Nase
*Attorney, Agent, or Firm*—Bruce H. Johnsonbaugh

[57] ABSTRACT

Objects, such as packages or containers, are supplied rapidly and intermittently to a machine, such as a case packer or a rotary device, which may include a feed belt, from an air-film conveyor which advances the objects by gas jets and includes a supply zone and, adjacently to the machine, a feed zone which is arranged to assist the acceleration of the objects to a greater extent than the supply zone. The acceleration assistance may be by a downward inclination of the feed zone (whereby gravity assists in the acceleration), by giving a steady or an intermittent greater kinetic impulse to the objects by gas jets in the feed zone, by providing auxiliary gas jets in the feed zone which may be activated only when the new advance of the objects is to occur, or by mechanical means which engage one or more of the objects, or by a combination of these expedients. The admission of objects to the machine is periodically blocked, as by gate means which may be provided or may be a part of the machine, or by nonmoving objects ahead of the leading object on the feed zone.

6 Claims, 12 Drawing Figures

PATENTED JUN 17 1975　　3,890,011
SHEET 1

PATENTED JUN 17 1975    SHEET 2    3,890,011

SUPPLYING OBJECTS FROM AN AIR-FILM CONVEYOR RAPIDLY AND INTERMITTENTLY TO A MACHINE

The invention relates to air-film conveyors for supplying objects in serial groups or singly, rapidly and intermittently to a machine, such as a case packer, a palletizer, a filling or a labelling machine (having, at times, a rotary turret which receives the objects singly) or a supporting belt, which may move laterally or in the same direction as the air-film conveyor.

It is known that objects, such as packages, containers and cans, can be conveyed on air-film conveyors, whereon they are propelled by a multitude of gas jets, usually formed by forwardly inclined gas passages formed in the conveyor floor or table, but at times formed in the side walls (lift holes being provided in the floor if necessary), the inclined passages being supplied with a gas — usually air — under pressure from a plenum chamber having a blower. (See, for example, U.S. Pat. Nos. 3,131,974 and 2,805,898.) It is also known that such conveyors are suitable for accumulating a series of objects in touching relation when the leading object is stopped by some blocking means, and for delivering the objects to a utilizing machine when the blocking means are ineffective.

A difficulty in such systems has been that the acceleration of the objects on the air-film conveyor after accumulation is at times slower than desired, having regard to the demands of the utilizing machine. While this acceleration can be increased by increasing the flow of propelling gas to the conveyor passages, which causes a greater impulse on the objects, this remedy is often not feasible, since too great a kinetic energy causes so rapid a movement of the objects on the conveyor that, when they are not touching, the objects upstream from any gap impacts with great momentum against any preceeding object, such as one that has been accumulated. Moreover, such high gas jet flows may cause excessively high pressures on the objects accumulated, causing crushing damage; further, high gas flows are wasteful of gas and compression costs.

The utilizing machine must, however, if it is to operate at full speed, be supplied rapidly with the objects, either singly or in groups, when it demands them; this implies that recovery from accumulation on the conveyor must be rapid. The demand is manifested by the opening of a blocking gate or by the forward movement of previously stationary objects ahead of those on the air-film conveyor, etc. For example, a case packer operates most efficiently when groups of objects (packages, containers, jars, cans, etc.) are fed to it in rapid succession, such as several objects within the first second of demand; the case packer thereafter cycles through a time sequence during which there is no demand, eventually again reaching a time of quick demand. (Such cycles may be repeated continuously.) Similarly, machines for filling containers will often demand them at the rate of several containers per second, suddenly after an interval without demand, or may require the containers to be supplied singly and rapidly but intermittently.

It was now found that recovery from accumulation can be increased greatly by giving the objects a small acceleration assistance, as by a slightly increased downward inclination of the zone of the conveyor which adjoins the machine (herein called the feed zone), or by other expedients as are described herein.

SUMMARY

According to the invention the rapid recovery from accumulation is achieved by moving the objects on an air-film conveyor having a supply zone which provides only moderate recovery from accumulation and, downstream therefrom, a feed zone leading to the utilizing machine which is arranged to assist the acceleration of the objects when the utilizing machine allows them to be fed to it. Usually the feed zone has a length to contain only a limited number of objects, such as the number in the group which is fed to the machine, or a smaller number, since the objects in the supply zone, when capable of reasonably good recovery from accumulation, move to catch up with those initially in the feed zone. In the case of machine which receives the objects singly, the feed zone may contain but a single object.

The means for periodically blocking the movement of objects to the machine may be a gate, provided either as an additional item of the conveyor or as a part of the utilizing machine; or it may be one or more non-moving objects, blocked by a gate in the machine or resting on an intermittently movable belt, which may have movement in the same direction as the air-film conveyor or laterally thereof. The blocking means is not, therefore, a necessary element of the mechanism of the invention, although some blocking means will always be present. As additional examples: in a rotary turret machine the blocking means may be the circular periphery of a rotating wheel or disc which has a series of notches for receiving containers singly; and in the case of a palletizer, it may be a feed belt or some other mechanical feeder which moves only when additional objects are to be introduced.

Acceleration assistance in the feed zone may be by any one or by a combination of the following: (1) The objects may be moved downwardly thereon, by inclining the feed zone table, even slightly, say to the amount of ½° to 10° to the horizontal in the downstream direction (more steeply than the supply zone, which is often horizontal), so that gravity assists in the forward acceleration. (2) The kinetic energy of the gas jets in the downstream direction acting on the objects may be made greater in the feed zone than in the supply zone, as by providing a steady or an intermittent high gas pressure in the portion of the plenum chamber which supplies the gas passages in the feed zone, greater than the gas pressure supplied to the passages in the suspply zone, and/or by providing more propulsion gas passages in the feed zone per unit area of the conveyor table in the feed zone than in the supply zone. Auxiliary jets may be provided in the feed zone and these may be operated continuously or may, optionally, have valve means which are responsive to the condition of the blocking means, to admit gas to the auxiliary jets when the blocking means are inoperative (opened) and to shut off the flow of gas thereto when the blocking means are operative (closed). (4) Mechanical means, such as one or a plurality of wheels, preferably arranged in pairs, having resilient, frictional object-engaging means or, in the case of cans or of objects which provide gaps at the outer parts between touching objects, one or more wheels having radially projecting spokes or fingers, movable in vertical, horizontal or intermediate planes, may be provided for positively accelerating the object or objects, rotating only when the machine demands an object or a group of objects.

GENERAL DESCRIPTION

Air-film conveyors inherently accelerate the objects contained therein after accumulation whenever the blocking means are opened, and the objects usually eventually attain the desired speed or even a greater speed, and it is only the acceleration which is, in the usual conveyor, too slow to supply the objects at the desired rate to the utilizing machine. It was now found, surprisingly, that only a very small acceleration assistance is required to supply the objects to the machine, and that accelerating a fractional part of the group demanded by the machine suffices, in many cases, since the subsequent members of the group which are initially in the supply zone attain a sufficiently high velocity to catch up with the preceding objects and to join the entering group.

Apart from any specific length of the feed zone, it was found that a very slight downward inclination of the feed zone (as little as 0.5°, usually at least 1° to 2° or more) can result in a forward motion of a group of objects very quickly, as compared with the forward motion of like objects on a horizontal table, similarly provided with gas passages; the latter was found to require 200 to 500% longer time to attain the same result.

In terms of kinetic energy of the gas jets acting upon the objects, as little as a 10% increase in the downstream kinetic energy of the gas acting on the objects often suffices to supply them at the desired rate, causing rapid acceleration toward the machine; but the kinetic energy may be increased by 100% or more over that in the supply zone, both when the higher kinetic energy is steady and when it is applied only when the utilizing machine demands additional objects. These values vvalues are also true for the use of auxiliary gas jets.

It is evident that if mechanical acceleration means are used, they must be synchronized with the utilizing machine. Thus, a wheel with spokes or fingers will have suitable mechanism to rotate only when the machine demands more objects.

Regarding the length of the feed zone, this depends largely upon the manner in which the articles are received by the machine. When accepted singly, the feed zone may contain only one or a few objects; but when a larger group of objects is accepted, the feed zone usually contains at least one-half of the number of objects in the group, up to the whole number or even more; it is, however, often necessary to make the feed zone long enough to include at least three-fourths of the number of objects in one group, perhaps four to six objects. The exact fraction depends principally upon the speed of recovery from accumulation in the supply zone. When the objects on the supply zone catch up with those on the feed zone, there is only a small momentum in the catching-up objects because the gap is small, and damage through impact does not usually occur.

DRAWINGS

The invention will be further described with reference to the accompanying drawings, which form a part of this specification and illustrate certain embodiments, wherein.

FIRST EMBODIMENT

Figure 1:
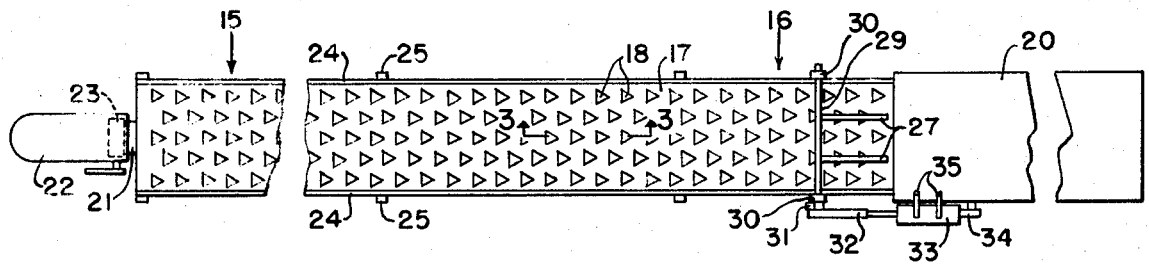
FIG. 1 is a plan of the first embodiment, wherein an inclination of the feed zone permits gravity to assist in the acceleration of the objects.

Referring to FIGS. 1–4, the system includes an air-film conveyor having a supply zone 15 and a feed zone 16, both having a common conveyor table 17 which is provided with gas passages 18 (see FIG. 3), e.g., formed by depressing the up-stream portions (appearing toward the left) of triangular table areas; however, the gas passages may be slots or otherwise formed. The passages are preferably arranged in staggered rows for emitting gas jets from a plenum chamber 19 with strong forward flow components in the downstream direction toward a utilizing machine 20. The staggered pattern improves uniform coverage of the table surface by the gas jets while insuring mechanical strength to the table. Gas — usually air — is supplied to the plenum chamber by a duct 21 from a blower 22, and the duct may be provided with a manually adjustable damper 23 to adjust the pressure within the chmber. (Similar dampers may be associated with other blowers in the subsequent embodiments.) Guide means, such as longitudinal rods 24 supported by vertical brackets 25, fixed to the sides of the plenum chamber, are preferably provided, the rods 24 being laterally spaced to slightly greater an interval than the width of the packages to be described.

The feed zone, which starts toward the right from the dashed line 26, is downwardly inclined from the inclination of supply zone 15, the inclination being shown at about 5° and that of the supply zone as 0° (horizontal). However, in this embodiment, the sizes and number per unit area of the gas passages are the same for the supply and feed zones.

The machine 20 operates to admit, intermittently, a number of objects, assumed for this discussion to be six. To stop the forward movement of objects on the conveyor when the machine is not in a condition to receive the objects, any suitable gate means may be provided, either as special equipment (part of the conveyor) or as a part of the utilizing machine 20. The gate means shown is merely representational to illustrate the presence of some gate means. As shown, the gate includes a pair of arms 27, having terminal, downwardly hooked projections 28 and fixed to a horizontal, transverse, shaft 29 which is rotatably mounted in vertical supporting brackets 30. Fixed to the shaft 29 is an actuating lever 31, which is pivotally connected to an actuating rod 32, the latter being reciprocable by a powered device 33 pivotally mounted at 34 to the machine 20. The device 33 may be a double-acting solenoid or pneumatic device, or a single-acting and spring-returned unit. It acts in response to the condition of the machine 20 to signals, such as electrical and/or pneumatic signals supplied through lines 35.

Figure 2:
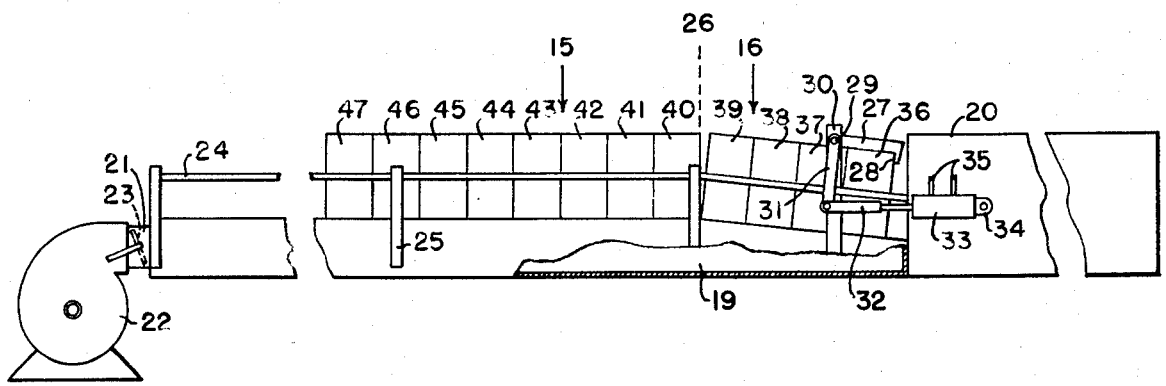
FIG. 2 is an elevation of FIG. 1, parts being broken away and packages being added.
Figure 3:
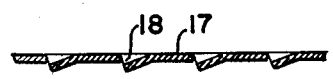
FIG. 3 is an enlarged sectional view, taken on the line 3—3 of FIG. 1.

In use, when the machine 20 is not ready to accept objects, it emits a signal via the lines 35 to cause the shaft 32 to move toward the left (as seen in FIGS. 1 and 2), thereby lowering the projections 28 into the path of the objects and arresting their forward movement. In FIG. 2 there are shown such articles, numbered 36–47, which were placed manually or mechanically on the air-film conveyor and were moved to the positions shown by the gas jets flowing through the passages 18. It is evident that the lowered positions of the projections 28 block further advance of the objects, resulting in their accumulation, with the objects 35–39 on the downwardly inclined feed zone and the objects 40–47 on the horizontal supply zone. The objects are stationary, and in touching relation.

When the machine 20 is ready to accept a fresh group of articles, a suitable signal is emitted via the lines 35, causing the device 33 to move the shaft 32 toward the right; this causes the arms 27 to be rotated with the shaft 29 to raise the projections 28, thereby releasing the object 36. Gravity assists in the rapid acceleration of the objects on the feed zone toward the machine 20, while those on the supply zone accelerate more slowly but enter with the same group.

Figure 4:
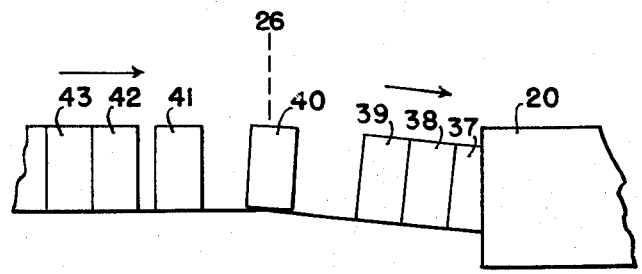
FIG. 4 is a diagrammatic view showing a series of packages moving on the first embodiment, showing the catching-up of objects initially in the supply zone.

It was assumed that the machine 20 would accept groups of six articles, but the feed zone 16 is only long enough to contain four objects. The ensuing action is illustrated in FIG. 4, wherein the article 36 (not shown, since it has entered the machine 20) and the articles 37–39 have moved toward the machine, being accelerated by gravity. The other articles accelerate more slowly, and some objects, such as those shown at 40 and 41, leave their following objects to create gaps. The articles 40 and 41 gain speed, especially upon entering the downwardly inclined feed zone, and soon move faster than the object 39, to catch up with the preceding articles and to enter the machine 20 as parts of the group.

SECOND EMBODIMENT

Figure 5:
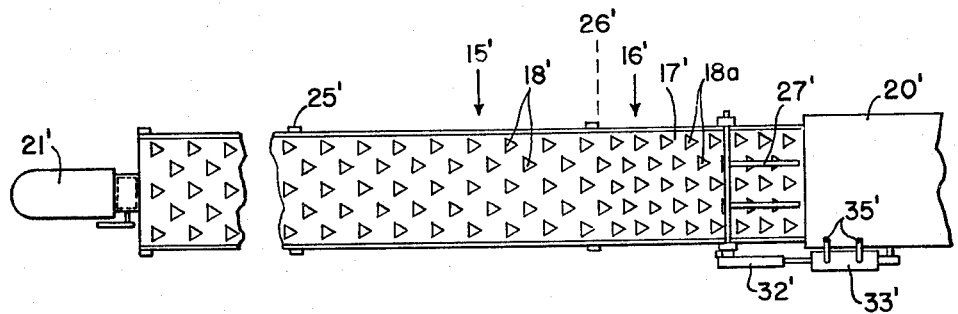
FIG. 5 is a plan of a second embodiment, showing both the use of more densely spaced group of gas passages in the feed zone and means for supplying gas at an increased pressure to the passages in the feed zone compared to those in the supply zone.
Figure 6:
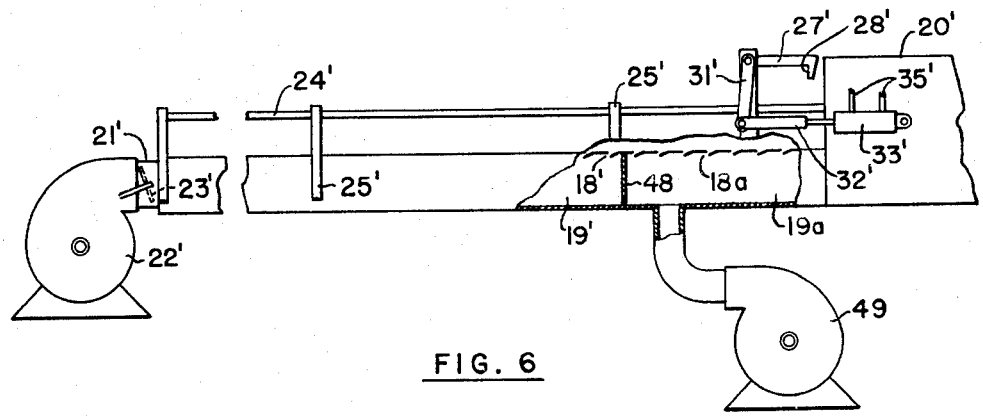
FIG. 6 is an elevation of FIG. 5, parts being broken away.

Referring to FIGS. 5 and 6, this embodiment shows two variants which may be applied individually, either with or without the inclination of the feed zone. Primed reference characters denote parts previously described. The passages 18a in the feed zone 17' are more closely spaced than the passages 18' in the supply zone, resulting in about one-third more passages of the same dimensions for a unit area of the conveyor table under the objects. Further, the plenum chamber contains a partition wall 48, which subdivides the chamber into a portion 19', supplied from the blower 22', and an auxiliary chamber 19a, which is supplied by a separate blower 49 to maintain the auxiliary chamber at a pressure higher than that of the portion 19'. Thereby gas at an increased pressure is supplied to the passages 18a of the feed zone, whereby each gas jet in the latter zone has a higher kinetic energy in the downstream direction than the gas jets in the supply zone.

It is understood that the mechanism for actuating the blocking arms 27' and projections 28' may be as previously described.

THIRD EMBODIMENT

Figure 7:
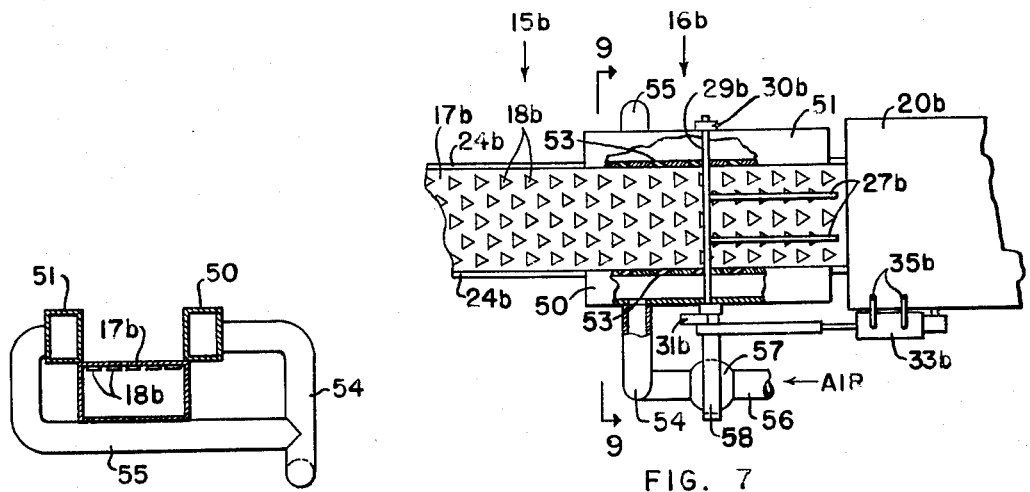
FIG. 7 is a fragmentary view of a third embodiment, using auxiliary jets inclined forwardly from side plenum chambers, parts being broken away.
Figure 9:
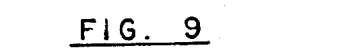
FIG. 9 is a sectional view, taken on the line 9—9 of FIG. 7.
Figure 8:
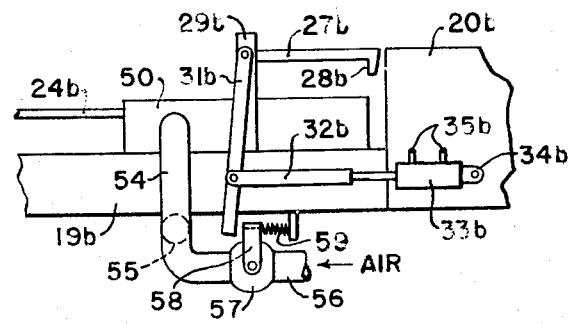
FIG. 8 is an elevation of FIG. 7.

Referring to FIGS. 7–9, wherein reference characters followed by the letter $b$ denote parts previously described, the gas passages 18b are of like size and number per unit area in both the supply and feed zones, and the table 17b may have the same inclination (e.g., horizontal) in these zones; however, the feed zone has auxiliary jet devices, which may include plenum chambers 50 and 51, the inner walls of which form confining walls for the air-film conveyor and have forwardly inclined gas passages 53. These chambers are supplied with gas under pressure via ducts 54 and 55 from a source (not shown, such as a blower) which supplies gas to a duct 56 at a rate controlled by a valve 57. This valve advantageously fully shuts off the flow of gas when closed; it has an operating lever 58 which is normally biased to the closed position of the valve by a spring 59, but which is forced to the open position by a bottom extension on the actuating lever 31b, so that whenever the device 33b is activated to move the shaft 32b to the right (indicating that the machine 20b is in condition to receive fresh objects) air under pressure flows through the ducts 54 and 55 and through the gas passages 53 to accelerate the objects in the feed zone.

Operation is as was previously described, save that the auxiliary gas jets, emitted through the inclined passages 53, impinge on the objects in the feed zone to assist in their acceleration. Again, the length of the feed zone may be selected as discussed above, and if this zone is shorter than the length requisite to contain the number of objects in one group, the discussion made with reference to FIG. 4 is applicable. Again the feed zone, shown to be horizontal, may be inclined downwardly.

FOURTH EMBODIMENT

Figure 10:
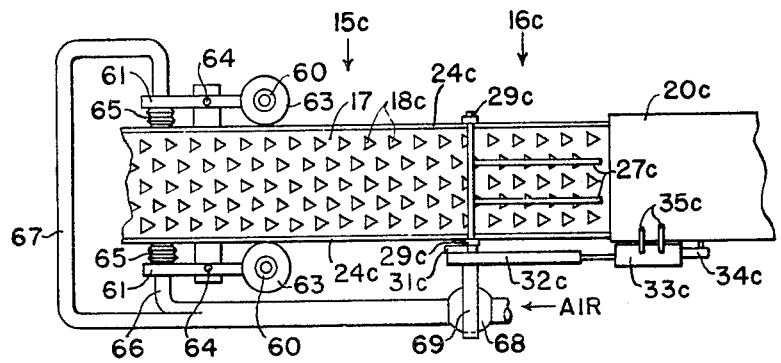
FIG. 10 is a fragmentary plan of a fourth embodiment, which uses mechanical frictional wheels to accelerate the objects.
Figure 11:
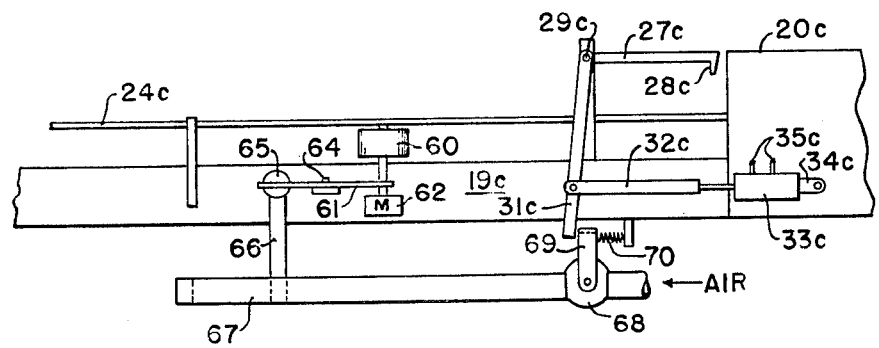
FIG. 11 is an elevation of FIG. 10.

Referring to FIGS. 10 and 11, again reference numbers followed by the suffix $c$ denote parts previously described, and the gas passages 18c may have uniform sizes and spacings in the table 17c, including the supply zone 15c and the feed zone 16c. The objects are assisted in acceleration after accumulation by one or pairs of wheels 60 which a journalled on vertical axles, carried by horizontally swingable arms 61, the wheels being driven by motors 62, which may be electric or pneumatic, in directions to move the objects toward the machine 20c. These wheels have pliable, frictional tires 63. Each arm 61 is pivoted on a vertical pin 64 carried by the conveyor and is moved by another motor, such as a pneumatic device 65, shown in the form of a bellows, in which air can be supplied by a duct 66 or a branch duct 67 from an air valve 68 to which air is supplied under pressure. This valve has its control arm 69 normally biased by an internal spring (not shown) to closed position, but the internal spring may be assisted or replaced by an external spring 70. The arm 69, on the side opposite to the spring, abuts a bottom extension of the actuating lever 31c, which opens the valve when the device 33c moves the shaft 32c to the right.

In operation, when the device 33c moves the shaft 32c to open the gate 27c, 28c, indicating that the machine 20c demands objects, the valve 68 is opened to admit air into the bellows 65 and cause the tires on the rotating wheels 60 to engage and accelerate the objects on the feed zone.

FIFTH EMBODIMENT

Figure 12:
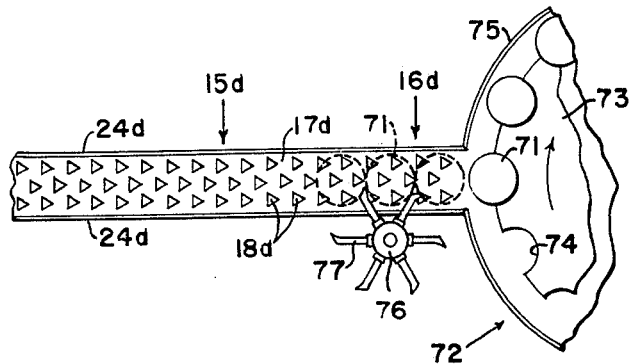
FIG. 12 is a fragmentary plan of a fifth embodiment, showing the use of a spoked wheel for assisting in acceleration, as applied to a machine which receives objects one at a time.

Referring to FIG. 12, wherein parts previously described are designated by like numbers followed by *d*, the air-film conveyor includes a table 17d with uniformly sized and spaced gas passages 18d and side guide rods 24d. It supplied objects — in this case assumed to be cans 71 — to a machine 72 which includes a circular plate or disc 73 having a series of notches 74 for receiving the cans one at a time and carrying them in an arcuate path within a stationary guide 75 as the disc is rotated intermittently or continuously in the direction of the arrow. The conveyor includes a wheel 76, rotatable on a vertical axis by an axle carried by the conveyor and having radial fingers or spokes 77 which enter the spaces between the touching cans 71. The wheel 76 is driven by any suitable low-power motor, e.g., a pneumatic motor supplied with air by duct means such as the duct 66 described for the previous embodiment. If desired, the wheel 76 can be driven intermittently, so as not to apply accelerating force to the cans when the row of cans 71 is stopped, as by the above-described valve 68.

In this embodiment the part 15d of the conveyor upstream from the wheel 76 is the supply zone and the part 16d between that zone and the machine 72 is the feed zone. The cans are assisted in acceleration on the feed zone into the notches 74 by the spokes of the wheel 76, but their advance is periodically blocked by the circular parts of the periphery of the disc 73 which are located between these notches.

EXAMPLE I

A series of seven packages, each containing two rolls of tissue paper, were stopped on an air-film conveyor in touching relation, respectively near the downstream end of a horizontal section and near the downstream end of a 5-foot section having a downward inclination of 1 inch per foot (4° 46′), the conveyor being constructed as shown in FIGS. 1 and 2. Two comparisons were made, one at a plenum chamber pressure P-1 at which recovery from accumulation on the horizontal section was fair (and which would be used for normal conveying thereon) and at a lower pressure P-2 at which recovery on the horizontal section was incipient. The cumulative number of packages passing forwardly of the line at the forward edge of the leading package was determined for various times, with the following results:

| Pressure | Incl. of conveyor table | 1 | Time, seconds 2    3 No. of packages | 7 |
|---|---|---|---|---|
| P-1 | Horizont. | 0 | 1    3 | 7 |
| P-1 | Downward | 3 | 7 | |
| P-2 | Horizont. | 0 | 0    0 | 0 |
| P-2 | Downward | 2½ | 7 | |

The great improvement in recovery caused by the slight downward inclination of the conveyor table is evident.

EXAMPLE II

The procedure and equipment of Example I were repeated, but using larger packages, each containing four rolls of tissue paper, with the following results:

| Pressure | Incl. of conveyor table | 1 | 2 | Time, seconds 2.5   3   3.5 No. of packages | 6 |
|---|---|---|---|---|---|
| P-1 | Horizont. | 1 | 2 | 4 | 7 |
| P-1 | Downward | 2 | 4 | 7 | |
| P-2 | Horizont. | 0 | 0 | 0   0   0 | 0 |
| P-2 | Downward | 1 | 4 | 7 | |

I claim:

1. An air-film conveyor for conveying articles thereon to a delivery point at the end thereof, comprising
    means defining an elongate conveyor table having a delivery end to which articles thereon are conveyed,
    means for providing a moving air film along the upper face of said conveyor table throughout the length thereof for both supporting articles thereon against gravity and continuously urging such articles in a downstream direction toward the delivery end of said conveyor table, and
    means for periodically stopping the downstream movement of articles on said conveyor table at a point adjacent said delivery and thereof,
    said elongate conveyor table including a downstream section adjacent said delivery end and extending throughout a selected length thereof upstream of said stopping means, and an upstream section extending throughout a length thereof upstream of said downstream section, and
    means for providing throughout said downstream section of said table a force urging articles thereon in a downstream direction greater than that of said upstream section,
    whereby the acceleration of articles from a stationary condition to a moving condition under the influence of such greater force is greater throughout said downstream section of said conveyor table than in said upstream section thereof.

2. An air film conveyor in accordance with claim 1 and including in said downstream section a plurality of auxiliary jet-forming devices for producing auxiliary gas jets having downstream flow components acting upon such articles.

3. An air film conveyor in accordance with claim 1, and including in said downstream section a plurality of auxiliary jet-forming devices for producing auxiliary gas jets having downstream flow components acting upon such articles, valve-controlled means for supplying gas under pressure to said auxiliary jet-forming devices, and control means for intermittently increasing the flow of gas to the auxiliary jet-forming devices.

4. An air film conveyor in accordance with claim 1, and including in said downstream section means for engaging said objects and advancing them in the downstream direction, and power means for driving said means.

5. An air film conveyor for conveying articles thereon to a delivery point at the end thereof, comprising means defining an elongate conveyor table having a delivery end to which articles thereon are conveyed, means for providing a moving air film along the upper face of said conveyor table throughout the length thereof for both supporting articles thereon against gravity and continuously urging such articles in a downstream direction toward the delivery end of said conveyor table, and means for periodically stopping the downstream movement of articles on said conveyor table at a point adjacent said delivery and thereof, said upper face of said conveyor table being inclined downwardly toward said delivery end adjacent said delivery end and throughout a selected length thereof upstream of said stopping means, the remaining portion of said upper face upstream of said selected length being substantially horizontal, whereby the acceleration of articles from a stationary condition to a moving condition under the influence of said moving air film is greater throughout said selected length of said conveyor table adjacent the delivery end than at locations on said conveyor table upstream thereof.

6. An air film conveyor in accordance with claim 5 wherein the downward inclination throughout said selected length is between 0.5° and 10° to the horizontal.

* * * * *